Patented July 25, 1939

2,167,070

UNITED STATES PATENT OFFICE 2,167,070

PROCESS FOR PREPARING LEUCO QUINIZARINE

Emeric Havas, Pitman, N. J., assignor to E. I. du Pont de Nemours & Company, Wilmington, Del., a corporation of Delaware No Drawing. Application August 3, 1938, Serial No. 222,836

2 Claims. (Cl. 260—383)

This invention relates to the preparation of leuco quinizarine, and more particularly to a new and improved process for preparing a leuco quinizarine of high quality and in high yields.

According to the literature, leuco quinizarine may be prepared in several ways, the most common being the reduction of quinizarine in acids with metals, or in caustic alkali with sodium hydrosulfite. The sulfuric acid-aluminum reduction method gives a very impure product in which a large amount of unchanged quinizarine remains, and purification renders the process for preparing pure leuco quinizarine too costly for commercial use.

Where quinizarine is reduced in caustic alkalies with alkali metal hydrosulfites, (see Journal für Praktische Chemie (2) Vol. 76, pages 139–140) the reaction is carried out in a large amount of water and a large excess of caustic or alkali hydrosulfite must be employed to effect complete reduction of all of the quinizarine. Due to the solubility of the leuco quinizarine in this alkaline solution, relatively low yields are obtained unless the mass is neutralized with acids, which has been found to cause the liberation of sulfur which is precipitated with and contaminates the desired leuco quinizarine.

It is the object of this invention to provide a process for preparing leuco quinizarine of uniformly high purity in high yields. A further object is to provide a process for preparing leuco quinizarine which is simple, and economical to operate and which is particularly adapted for large scale operation, doing away with the need for the careful adjustment and control of alkalinities heretofore necessary to effect complete precipitation of the leuco quinizarine.

According to the present invention, finely divided quinizarine is suspended in an aqueous solution of alkali metal carbonate (including ammonium carbonate) to which sufficient alkali metal hydrosulfite has been added to reduce all of the quinizarine to the leuco quinizarine. The mass is agitated at from 20 to 70° C. until reduction is complete, at which time all of the leuco quinizarine is precipitated out of solution. Only sufficient water need be employed to give a good stirrable suspension of the quinizarine. The amount of alkali metal carbonate employed may be varied within reasonable limits, although 1 part of carbonate per part of quinizarine is found to be satisfactory. Sufficient alkali metal hydrosulfite should be used to insure complete reduction of the quinizarine. A large excess is not detrimental. By using the alkali metal carbonate in place of caustic alkali, the volume of water employed may be greatly reduced. Because of the insolubility of the leuco quinizarine in the alkali metal carbonate solution, the leuco quinizarine precipitates out as it is formed in a high state of purity, and no further adjustment of the alkalinity of the solution is necessary. Because of the complete precipitation of the leuco quinizarine as soon as formed, no further reduction to other than the leuco quinizarine takes place, resulting in a product of high purity and one which on further condensation gives high yields of color.

The following examples are given to illustrate the invention. The parts used are by weight.

Example 1

2000 parts of water, 100 parts of sodium carbonate and 100 parts of quinizarine (dry basis) as a press cake containing 25 to 30% of quinizarine are mixed until the quinizarine is uniformly suspended in the solution. The temperature of the mass is then adjusted to 25 to 30° C. 84.7 parts of 100% sodium hydrosulfite are added. The mass is then stirred at a temperature of 25 to 30° C. for a period of from 3 to 4 hours, making certain that there is an excess of sodium hydrosulfite present in the mass at all times. The progress of the reaction can be observed in the change of color from the bright orange of the quinizarine to the clear yellow color of the leuco quinizarine. The suspension is filtered and washed with water (25 to 30° C.) until a comparatively clear filtrate results. The cake is then dried at any convenient temperature up to 90° C. When the ordinary grade of technical quinizarine is used in this process, the resulting leuco quinizarine has a melting point of 148° C. and is obtained in a yield of approximately 94% of theory. If pure quinizarine is employed, a product having a melting point of 158 to 159° C. is obtained in a yield of over 95% of theory.

Example 2

Where powdered quinizarine is employed as a starting material, it is desirable that a wetting agent be employed to effect proper dispersion of the quinizarine in the suspending solution, as illustrated by the following procedure:

1000 parts of water, 50 parts of quinizarine and 1 part of "Gardinol" (technical laural sulfate) are stirred until a uniform dispersion results. 50 parts of sodium carbonate or the equivalent amount of potassium carbonate (65 parts) and 50 parts of sodium hydrosulfite are then added, and the mass is heated to 60° C. under agitation until no more carbon dioxide is liberated or until microscopic examination shows no unchanged quinizarine in the mass. This suspension becomes a clear yellow color in approximately ½ hour indicating complete reduction. It is filtered and the filter cake is washed with water (room temperature), and dried at 60° C. in vacuo. 48 parts of leuco quinizarine are obtained having a melting point of 155° C.

Ammonium carbonate may be substituted for the sodium carbonate or potassium carbonate in the above examples with the same results.

By the use of the carbonate as above illustrated, a leuco quinizarine is obtained in an exceedingly pure form and without the need of careful regulation of the alkalinity to effect the complete precipitation of the leuco quinizarine which is required when caustic alkalies are employed. Since the amount of water used may be greatly reduced, and the reaction may be carried out at room temperatures without the application of external heat, this process is particularly adapted for large scale operation. The product is obtained in such pure form that it may be used directly in the preparation of dyestuffs for which leuco quinizarine is commonly employed.

I claim:

1. The process for preparing leuco quinizarine which comprises suspending quinizarine in an aqueous alkali metal carbonate solution and effecting reduction of the quinizarine with an alkali metal hydrosulfite, sufficient hydrosulfite being employed in the solution to reduce all of the quinizarine to leuco quinizarine.

2. The process for preparing leuco quinizarine which comprises suspending 1 part of quinizarine in about 20 parts of water containing 1 part of sodium carbonate and 1 part of sodium hydrosulfite and agitating the suspension at about 60° C. until the color of the suspension changes to a clear yellow, and no unchanged quinizarine can be detected when a sample is examined under the microscope.

EMERIC HAVAS.